United States Patent
Cunningham et al.

(10) Patent No.: US 7,768,382 B2
(45) Date of Patent: Aug. 3, 2010

(54) VEHICLE MISFUELING MITIGATION SYSTEM AND METHOD

(75) Inventors: Ralph Wayne Cunningham, Milan, MI (US); Mark William Peters, Wolverine Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 319 days.

(21) Appl. No.: 12/098,169

(22) Filed: Apr. 4, 2008

(65) Prior Publication Data

US 2009/0251302 A1 Oct. 8, 2009

(51) Int. Cl.
- B60Q 1/00 (2006.01)
- B60C 7/12 (2006.01)
- G05D 1/00 (2006.01)
- G06F 7/00 (2006.01)
- G06F 17/00 (2006.01)

(52) U.S. Cl. .................. 340/438; 340/439; 701/103
(58) Field of Classification Search .......... 340/438, 340/439, 450, 457, 450.2; 60/277, 276, 285, 60/601.5, 286; 123/549, 686, 672, 406, 515; 701/99, 101, 103, 104, 109
See application file for complete search history.

(56) References Cited

U.S. PATENT DOCUMENTS

| | | | | |
|---|---|---|---|---|
| 4,594,968 A | * | 6/1986 | Degobert et al. | 123/1 A |
| 5,033,293 A | * | 7/1991 | Honma et al. | 73/114.38 |
| 5,142,864 A | | 9/1992 | Dunne | 60/274 |
| 5,172,655 A | * | 12/1992 | Forgacs | 123/1 A |
| 5,209,062 A | | 5/1993 | Vollenweider | 60/280 |
| 5,237,978 A | * | 8/1993 | Bailey | 123/515 |
| 5,282,451 A | * | 2/1994 | Yoshida et al. | 123/406.15 |
| 5,701,863 A | * | 12/1997 | Cemenska et al. | 123/198 D |
| 6,325,054 B1 | | 12/2001 | Wenger et al. | 123/559.2 |
| 6,397,588 B1 | | 6/2002 | Bruck et al. | 60/299 |
| 6,566,892 B2 | * | 5/2003 | Schaefer et al. | 324/663 |
| 6,714,856 B2 | * | 3/2004 | Huff et al. | 701/114 |
| 6,729,128 B2 | | 5/2004 | Shiratani et al. | 60/297 |
| 2003/0213231 A1 | | 11/2003 | Tabata | 60/280 |
| 2005/0000589 A1 | * | 1/2005 | Dillon | 141/94 |
| 2006/0080953 A1 | | 4/2006 | Maus et al. | 60/286 |
| 2007/0130946 A1 | | 6/2007 | Winsor et al. | 60/605.1 |

* cited by examiner

*Primary Examiner*—Jennifer Mehmood
(74) *Attorney, Agent, or Firm*—Julia Voutyras; Alleman Hall McCoy Russell & Tuttle LLP

(57) ABSTRACT

A method is provided to indicate improper fuel filling in a vehicle. An indicator is actuated if a proportion of alcohol in the fuel is outside a range of expected proportions. In some examples, the range corresponds to a non-flex fuel vehicle recommended range, or to a normal range for a low alcohol-content fuel, which may be between 0 and 15 percent alcohol by volume. The indicator may include a diagnostic code or a dash light. Further, the indicator may be actuated in combination with a mitigating action, which may involve adjustment of a fuel injector pulse width or an ignition spark timing, as examples.

18 Claims, 3 Drawing Sheets

VEHICLE MISFUELING MITIGATION SYSTEM AND METHOD

TECHNICAL FIELD

The present application relates to fault diagnosis and mitigation in motor vehicles, and more particularly to fueling error diagnosis and mitigation.

BACKGROUND

Motor-vehicle fuels of different compositions are sold alongside each other at filling stations. In particular, fuel mixtures comprising ethanol and gasoline are increasingly available, some of which may be used in conventional gasoline engines, while others may be used only in specially configured engines. E85, for instance, is a suitable fuel for so called flex-fuel vehicles: vehicles configured to run on widely varying fuel mixtures. Other mixtures, E10, for example, can be used in conventional gasoline engines so long as an appropriately homogenized mixture is provided.

However, some fuel distributors rely on splash blending during fuel transport to homogenize fuel mixtures. This method does not guarantee homogeneity and may result in a stratified mixture being supplied to the filling station. Thus, the mixture supplied to a customer's fuel tank may differ substantially from the expected composition. Moreover, stratification of a well-homogenized fuel mixture may occur on long standing in a vehicle's fuel tank as a result of repeated evaporation and condensation of fuel components. These factors may result in an inappropriately alcohol-rich fuel mixture being supplied to a gasoline engine not specially configured and/or controlled for alcohol-rich mixtures.

Further, vehicle fuel tank misfueling may be caused by simple, human error: a motorist or filling-station attendant may erroneously pump E85, for example, into a non-flex fuel vehicle. Results of misfueling may include degraded operation, e.g., stalling, difficulty starting, and rough idle. Further still, the misfueled motor vehicle may issue malfunction codes (MIL codes) that misdiagnose the problem. Misdiagnosis could trigger the servicing or replacement of non-defective, expensive parts, such as catalysts, fuel injectors, fuel pumps, exhaust gas oxygen sensors, or others. In addition, damage may occur to fuel-system or engine parts that are not resistant to high alcohol concentrations.

Finally, as alcohol-based fuels and alcohol-fueled vehicles become ever more common, the converse problem may arise: a vehicle designed to run on high-alcohol content fuel may be fueled erroneously with gasoline.

The inventors herein have recognized the above problems and have devised various solutions. For example, a method is provided to indicate improper fuel filling in a vehicle. In this method, an indicator is actuated if a proportion of alcohol in the fuel is outside a range of expected proportions. In some examples, the range corresponds to a non-flex fuel vehicle recommended range, or to an expected range for a low alcohol-content fuel, which may be between 0 and 15 percent alcohol by volume. The indicator may include a diagnostic code or a dash light. Further, the indicator may be actuated in combination with a mitigating action, which may involve adjustment of a fuel injector pulse width or an ignition spark timing, as examples.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
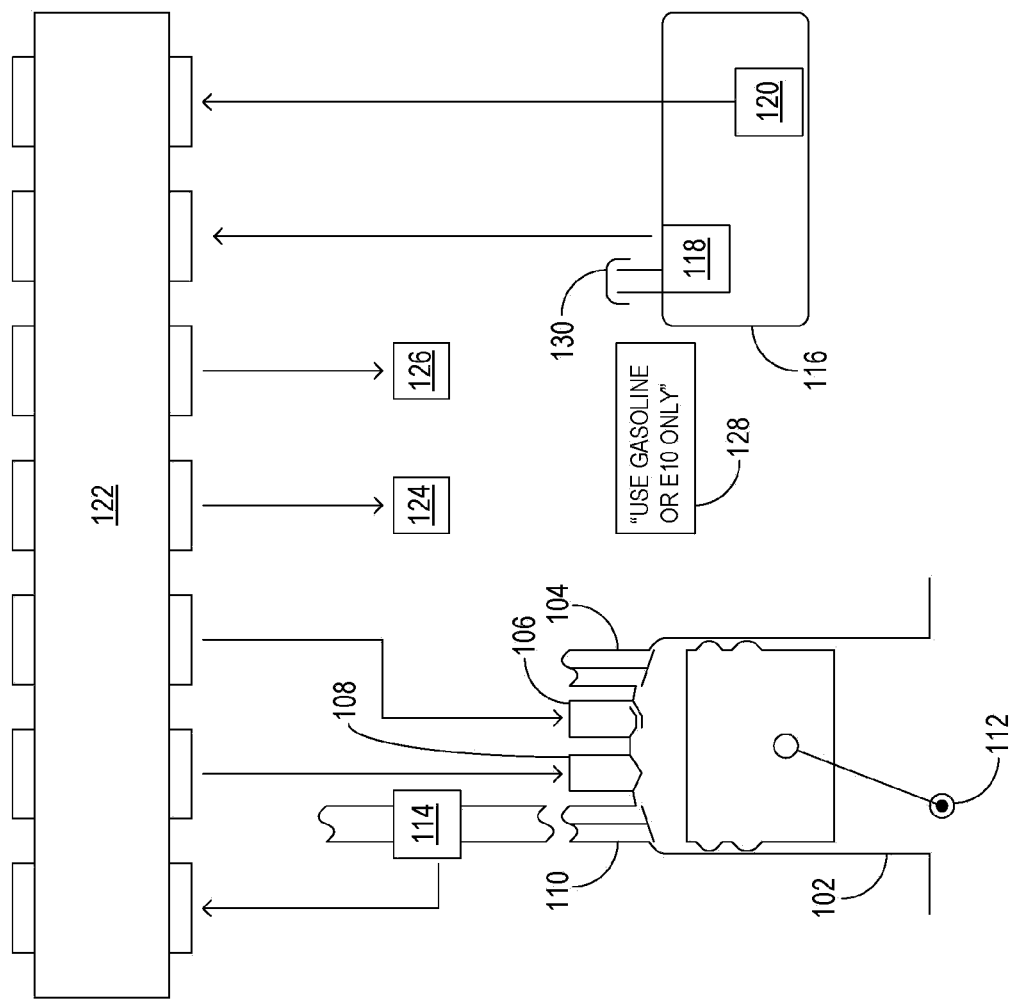
FIG. 1 shows an example configuration of vehicle components in accordance with the present disclosure.

FIG. 1 shows an example configuration of vehicle components in accordance with the present disclosure. FIG. 1 shows cylinder 102 with intake valve 104, spark-ignition device 106, fuel injector 108, exhaust valve 110, and crank-angle sensor 112. Cylinder 102 may be one of several cylinders in an engine of a vehicle. In this example, at least some fuel enters cylinder 102 through fuel injector 108. Air enters cylinder 102 through intake valve 104. In some embodiments, fuel may enter the cylinder through the intake valve as well as the fuel injector. Thus, the configuration of components shown in FIG. 1 is intended to enable direct injection and arbitrary combinations of direct and port injection.

FIG. 1 also shows air-fuel ratio sensor 114, fuel tank 116, refill sensor 118, fuel composition sensor 120, and controller 122. Refill sensor 118 is a device installed in the vehicle and configured to generate an output signal that indicates when fuel has been added to a fuel tank of the vehicle. Fuel composition sensor 120 is a device installed in the fuel system of the vehicle and configured to generate an output signal that is a function of the alcohol content of the fuel, i.e., the proportion or relative amount of alcohol in the fuel. Note that the proportion of alcohol in a fuel may be expressed as a volume percent or as a weight percent, which are interconvertible if the composition or distribution of the alcohols in the fuel is known. Alcohols that may be included in motor-vehicle fuel blends include methanol, ethanol, isopropyl alcohol, and others. In this example, refill sensor 118 and fuel composition sensor 120 are enclosed within fuel tank 116, but in other embodiments, they may be located elsewhere within the fuel system. In particular, fuel composition sensor 120 may be located within or in proximity to a conduit that conducts fuel from fuel tank 116 to a fuel pump of the vehicle. In this way, the fuel composition sensor may be configured to reflect specifically an alcohol content of the fuel entering the fuel pump (in the event that alcohol is distributed inhomogeneously within the fuel system).

Controller 122 is configured to accept input signals from crank-angle sensor 112, air-fuel ratio sensor 114, refill sensor 118, and fuel composition sensor 120. Controller 122 is further configured to provide control signals to spark-ignition device 106 and fuel injector 108. FIG. 1 also shows high-alcohol indicator 124 and low-alcohol indicator 126, to which controller 122 is further configured to provide control signals. High-alcohol indicator 124 and low-alcohol indicator 126 are configured to receive control signals from controller 122 and to alert an operator of the vehicle when the alcohol content of the fuel is outside an expected range. In some embodiments, one or more of the indicators may be visual, e.g., an illuminated signal on a dashboard of the vehicle. In some embodiments, one or both of the indicators may be audible. In still other embodiments, one or both of the indicators may include setting a diagnostic code in an on-board diagnostic system of the vehicle. The code may indicate the manner of vehicle misfueling, e.g. alcohol content too high or too low, and may be readable by a universal diagnostic code reader of a kind known in the art.

Finally, FIG. 1 shows fixed fueling indicator 128, which indicates a range of expected proportions of alcohol in the vehicle fuel. In this example, fixed fueling indicator 128 is a label located on or close to fuel filling cap 130 that indicates the range implicitly in words. Other such examples might include "UNLEADED GASOLINE ONLY" or "GASOLINE/E10 ONLY," to indicate that the expected range is 0 to 10 percent ethanol by volume. In still other examples, the range of expected proportions of alcohol may be stated more explicitly, "ALCOHOL 15% MAXIMUM," for example. Any of these examples may be included as an indicator that the vehicle is a non-flex fuel vehicle. In other embodiments, fixed fueling indicator 128 may be separate from the vehicle but included as text in an owner's manual of the vehicle. The information conveyed by fixed fueling indicator 128 may in some embodiments be consistent with the language used to market the vehicle for sale. Thus, a vehicle comprising the components shown in FIG. 1 and the fixed fueling indicator included therein may be marketed as a "gasoline-only" vehicle or a "non-flex fuel" vehicle.

It should be understood that FIG. 1 is entirely schematic. The components included therein may comprise significant structure not shown in the figure. The structure that is shown may be rendered in a simplified form. For example, spark-ignition device 106 may comprise not only a spark plug, as the drawing suggests, but also a distributorless spark-ignition system that provides voltage to the spark plug. Likewise, controller 122 may comprise a plurality of interconnected electronic devices distributed throughout the vehicle. It should further be understood that FIG. 1 is intended to be non-limiting. For instance, the vehicle engine may comprise additional cylinders with additional fuel injectors and additional sensors. Controller 122 may be configured to accept input signals from the additional sensors as well, and to provide control signals to the additional fuel injectors.

Figure 2:
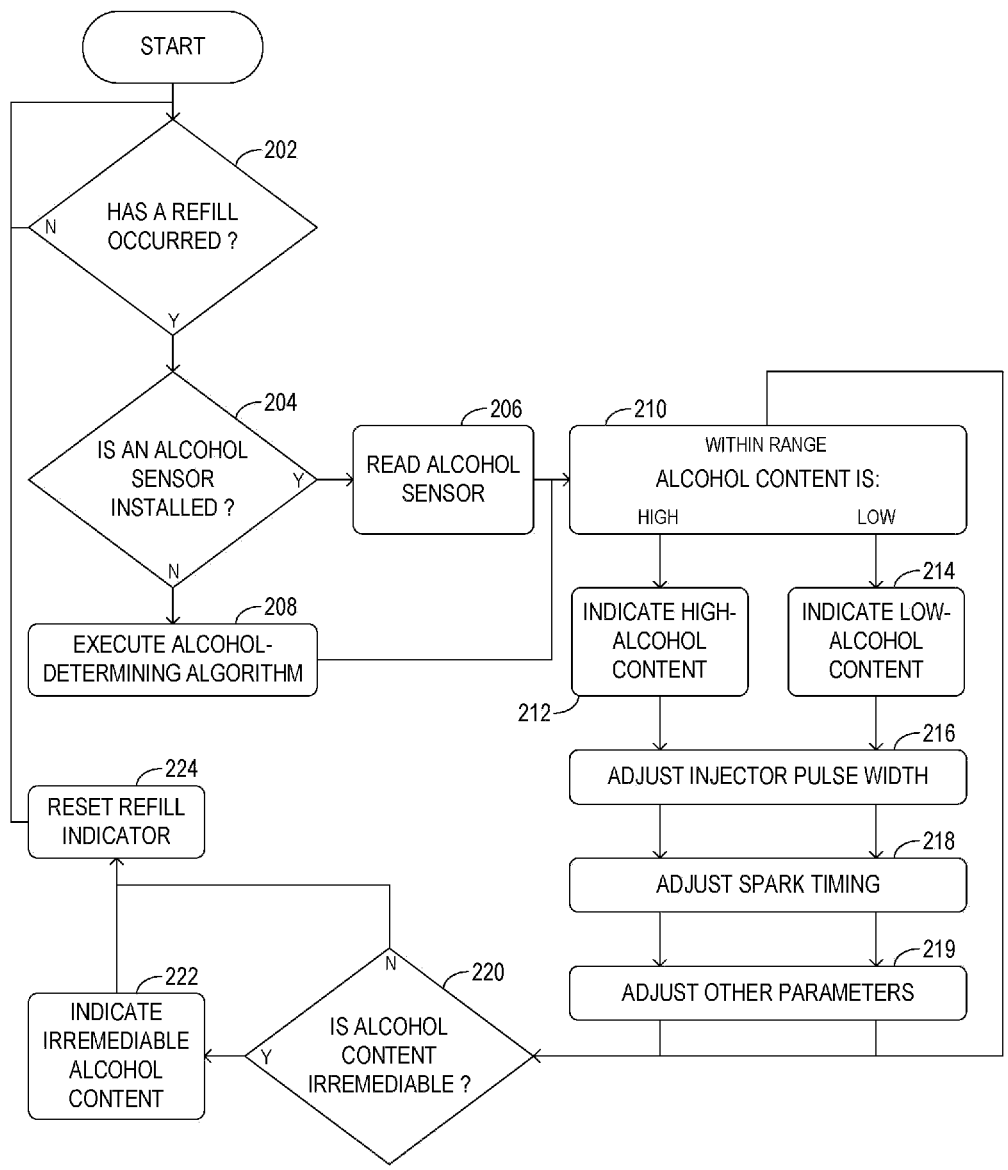
FIG. 2 illustrates, by way of a flow chart, an example algorithm for fueling error diagnosis and mitigation in accordance with the present disclosure.

FIG. 2 illustrates, by way of a flow chart, an example algorithm by which controller 122 may execute fueling diagnosis and mitigation in accordance with the present disclosure. In describing the algorithm, continued numerical reference is made to the components of FIG. 1. At 202, controller 122 determines if a refill of fuel tank 116 has occurred. In making this determination, controller 122 may rely on an input signal from refill sensor 118. At 204, controller 122 determines if a fuel composition sensor, e.g. fuel composition sensor 120, is installed in the fuel system of the vehicle. If a fuel composition sensor is installed, then at 206, controller 122 reads an output from the fuel composition sensor to determine the content of alcohol in the fuel.

If no fuel composition sensor is installed, then at 208, controller 122 executes an alcohol-determining algorithm to determine the content of alcohol in the fuel. In one example, the alcohol-determining algorithm may include controller 122 metering an amount of fuel through fuel injector 108 and an amount of air through intake valve 104, and receiving an input from air-fuel ratio sensor 114. These steps may be performed iteratively, with one or more of the metered amounts adjusted at each iteration to maintain the air-fuel ratio sensor at stoichiometry. As is known in the art, the metered amounts may be used by controller 122 to calculate an oxygen content in the fuel, which may be used to estimate the alcohol content of fuel mixtures composed substantially of hydrocarbons and alcohol.

Whether determined by reading a sensor or by executing an alcohol-determining algorithm as described above, the alcohol content of the fuel is compared, at 210, to threshold values $A_H$ and $A_L$, with $A_H > A_L$. If the alcohol content of the fuel is between $A_H$ and $A_L$, it is indicated to be within the expected range for the vehicle. If the alcohol content of the fuel is above $A_H$, then at 212, controller 122 activates high-alcohol indicator 124. If the alcohol content of the fuel is below $A_L$, then at 214, controller 122 activates low-alcohol indicator 126. Note that the conditions $A_H=0$, $A_L=0$, $A_H=100\%$ by volume, and $A_L=100\%$ by volume are each allowed in some embodiments.

The example algorithm illustrated in FIG. 2 further comprises adjusting one or more engine operating parameters with actuation of high-alcohol indicator 124 or low-alcohol indicator 126. In this way, controller 122 may be configured to take mitigating action when a proportion of alcohol in the fuel system is unexpectedly high or low. At 216, controller 122 adjusts a pulse width of a fuel-delivery pulse of fuel injector 108 based on the alcohol content of the fuel. The pulse width may be adjusted if the alcohol content of the fuel is above $A_H$ and/or below $A_L$. In some examples, controller 122 may be configured to increase the injector pulse width with increasing alcohol content of the fuel and to decrease the injector pulse width with decreasing alcohol content of the fuel.

At 218, controller 122 adjusts a timing of spark-ignition device 106 based on the alcohol content of the fuel. The timing may be adjusted if the alcohol content of the fuel is above $A_H$ and/or below $A_L$. In some examples, controller 122 may be configured to advance the spark from spark-ignition device 106 with increasing alcohol content of the fuel and to retard the spark from spark-ignition device 106 with decreasing alcohol content of the fuel.

At 219, controller 122 takes further mitigating action by adjusting other vehicle parameters based on the alcohol content of the fuel. The further mitigating action may be taken if the alcohol content of the fuel is above $A_H$ and/or below $A_L$. Examples of further mitigating action may include modifying how throttle position varies with torque request as a function of alcohol content, or changing a compression ratio of a turbocharger as a function of alcohol content. Such adjustments may be advantageous due to the lower power density of alcohol fuels relative to gasoline.

In this example, adjusting injector pulse width at 216, adjusting spark timing at 218, and adjusting other parameters at 219 are executed only when the alcohol content of the fuel is above $A_H$ or below $A_L$. In other embodiments, steps 216 to 219 may be executed as functions of the alcohol content of the fuel irrespective of whether said content is outside an expected range for the vehicle.

Continuing in FIG. 2, at 220, controller 122 compares the alcohol content of the fuel to threshold values $A_{HH}$ and $A_{LL}$, with $A_{HH} \geq A_H$, $A_{LL} \leq A_L$, and $A_{HH} > A_{LL}$. In one example, these values may bracket an alcohol-content interval outside of which the vehicle may not be able to operate acceptably. In other examples, they may bracket an interval outside of which serious damage to the vehicle may occur. If the alcohol content of the fuel is above $A_{HH}$ or below $A_{LL}$, then at 222, controller 122 indicates to the operator of the vehicle that the alcohol content of the fuel is outside of a remediable operating range. In one example, the indication may include enhancing an output of high-alcohol indicator 124 or low-alcohol indicator 126, such as by causing a panel lamp to blink, an audible indicator to sound more loudly, etc.

Finally, at 224, controller 122 resets refill sensor 118 so that evaluation of the alcohol content in the fuel may be suspended until the next refill. Thus, in this example, the alcohol content of the fuel is evaluated, indicator status is updated, and mitigating actions are taken only once with each refill event. Other embodiments are contemplated, however, in which steps 204 through 222 are executed repeatedly throughout the fueling cycle.

Figure 3:
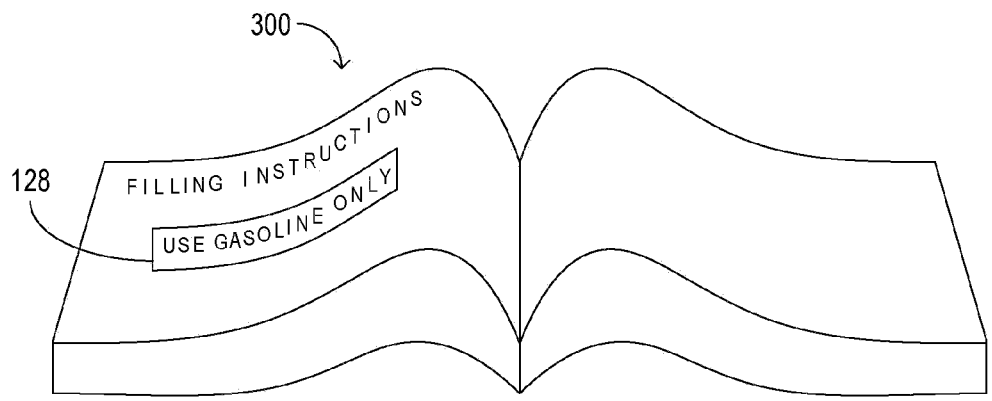
FIG. 3 shows a schematic diagram of an owner's manual of a vehicle with an example fixed fueling indicator.
Figure 4:
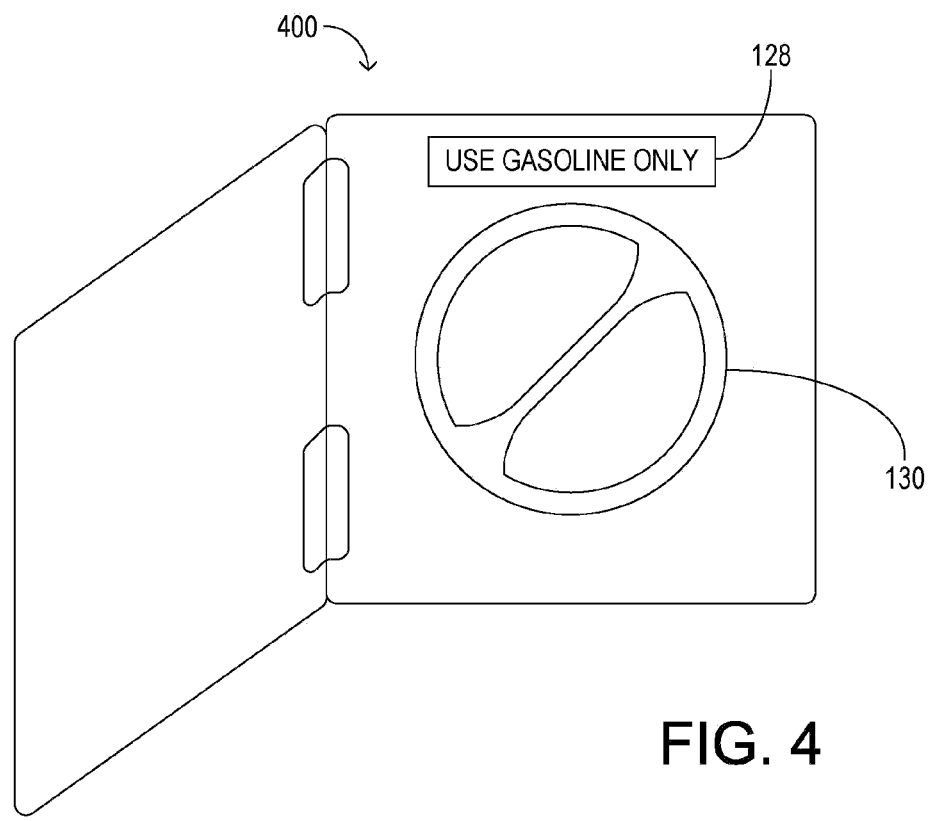
FIG. 4 shows a schematic diagram of a fuel door of a vehicle with an example fixed fueling indicator.

FIGS. 3 and 4 are included to illustrate example dispositions of fixed fueling indicators in accordance with the present disclosure. Thus, FIG. 3 shows a schematic diagram of owner's manual 300 of a vehicle with fixed fueling indicator 128 as text in the owner's manual. FIG. 4 shows a schematic diagram of fuel door 400 of a vehicle with fixed fueling indicator 128 as a label juxtaposed to fuel filling cap 130.

It should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A method to indicate improper fuel filling in a vehicle, the method comprising:
   actuating a first indicator if a proportion of alcohol in the fuel is outside a first range;
   wherein the first range is an expected range for the vehicle; further comprising adjusting an engine operating parameter with actuation of the first indicator; further comprising at least one of enhancing an output of the first indicator and actuating a second indicator if said proportion is outside a second range; wherein the second range encloses the first range.

2. The method of claim 1, where the first range corresponds to a non-flex fuel vehicle recommended range.

3. The method of claim 1, where the first range is an expected range for a low alcohol-content fuel.

4. The method of claim 1, where the first indicator includes an illuminated dashboard signal.

5. The method of claim 1, where the first indicator includes a diagnostic code, readable by a diagnostic code reader.

6. The method of claim 1, wherein the engine operating parameter includes a fuel injection pulse width.

7. The method of claim 6, wherein the engine operating parameter includes a fuel injection pulse width.

8. The method of claim 1, wherein said proportion is estimated based on an output of a fuel composition sensor.

9. The method of claim 1, wherein said proportion is estimated based on a fuel injection amount, an intake air flow amount, and an exhaust-stream oxygen sensor output.

10. The method of claim 1, wherein the alcohol includes ethanol.

11. The method of claim 10, wherein an upper limit of the first range is less than or substantially 10 percent ethanol by volume.

12. A system for a non-flex fuel vehicle, the system comprising:
    a fuel system;
    a first indicator for the vehicle indicating that the vehicle is a non-flex fuel vehicle;
    a control system that actuates a second indicator in the vehicle if a proportion of alcohol in the fuel system is above a first threshold;
    wherein the first threshold corresponds to a proportion of alcohol outside a range identified in the first indicator.

13. The system of claim 12, where the first indicator includes a fuel filling cap label.

14. The system of claim 12, where the first indicator includes text in an owner's manual of the vehicle.

15. The system of claim 12, where the control system is further configured to take mitigating action with actuating the second indicator.

16. A system for a non-flex fuel vehicle, the system comprising:
    a fuel system;
    a first indicator for the vehicle indicating that the vehicle is a non-flex fuel vehicle;
    a control system that actuates a second indicator and takes a mitigating action in the vehicle if a proportion of alcohol in the fuel system is above a first threshold.

17. The system of claim 16, wherein the second indicator includes at least one of a diagnostic code and an illuminated dashboard signal.

18. The system of claim 17, wherein the mitigating action includes adjusting at least one of a fuel injection pulse width and an ignition spark timing.

* * * * *